United States Patent
Yun et al.

(10) Patent No.: US 10,412,344 B2
(45) Date of Patent: Sep. 10, 2019

(54) SURVEILLANCE SYSTEM INCLUDING VIDEO WALL

(71) Applicant: HANWHA TECHWIN CO., LTD., Seongnam-si (KR)

(72) Inventors: YoungIn Yun, Seongnam-si (KR); JaeWon Choi, Incheon (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 586 days.

(21) Appl. No.: 15/080,990

(22) Filed: Mar. 25, 2016

(65) Prior Publication Data

US 2016/0353063 A1  Dec. 1, 2016

(30) Foreign Application Priority Data

May 27, 2015  (KR) .................. 10-2015-0073936

(51) Int. Cl.
*G06F 3/14* (2006.01)
*H04N 7/18* (2006.01)
(Continued)

(52) U.S. Cl.
CPC .......... *H04N 7/181* (2013.01); *G06F 3/1446* (2013.01); *G09G 2300/026* (2013.01); *G09G 2356/00* (2013.01); *H04N 5/64* (2013.01)

(58) Field of Classification Search
None
See application file for complete search history.

(56) References Cited

U.S. PATENT DOCUMENTS 4,800,376 A * 1/1989 Suga ................. G06F 3/153
                                                345/1.3
5,784,035 A * 7/1998 Hagiwara .......... G06F 3/1446
                                                345/1.3
(Continued)

FOREIGN PATENT DOCUMENTS

CN  102208178 A  * 10/2011
JP  2004-173277 A  6/2004
(Continued)

OTHER PUBLICATIONS

English Machine Translation of Rong et al. (CN 102208178) (Year: 2011).*

(Continued)

*Primary Examiner* — Mohammed Jebari
(74) *Attorney, Agent, or Firm* — Ladas & Parry LLP

(57) ABSTRACT

A surveillance system including a video wall is provided. The surveillance system includes a plurality of video decoders configured to connect to the plurality of monitors in a one-to-one correspondence, respectively determine at least one image among a plurality of images based on first information, respectively receive an image-allocation area of the at least one image based on second information, the plurality of images respectively being provided from a plurality of cameras, and respectively input the image-allocation area to the plurality of monitors according to the one-to-one correspondence; and a video wall controller configured to provide each of the plurality of video decoders with the first information indicating at least one camera corresponding to the at least one image and the second information indicating an image-allocation area of the at least one image based on an entire video wall image.

14 Claims, 10 Drawing Sheets

(51) Int. Cl.
*H04N 7/01* (2006.01)
*H04N 5/64* (2006.01)

(56) References Cited

U.S. PATENT DOCUMENTS

| | | | |
|---|---|---|---|
| 7,450,176 B2 | 11/2008 | Koh | |
| 9,143,759 B2* | 9/2015 | Choi | H04N 7/181 |
| 2006/0165309 A1* | 7/2006 | Yachi | H04N 5/232 |
| | | | 382/284 |
| 2008/0211825 A1* | 9/2008 | Sunakawa | G06F 3/1446 |
| | | | 345/581 |
| 2009/0109125 A1* | 4/2009 | Young | G06F 3/1446 |
| | | | 345/1.3 |
| 2010/0033632 A1* | 2/2010 | Tsukagoshi | G06F 3/1431 |
| | | | 348/588 |
| 2010/0315436 A1 | 12/2010 | Chan | |
| 2011/0229106 A1 | 9/2011 | Cho | |
| 2012/0242893 A1* | 9/2012 | Akitomo | G06F 3/1446 |
| | | | 348/441 |
| 2013/0002688 A1* | 1/2013 | Zhu | G06F 3/1446 |
| | | | 345/502 |
| 2013/0141543 A1* | 6/2013 | Choi | H04N 7/181 |
| | | | 348/47 |
| 2015/0187324 A1* | 7/2015 | Kim | G06F 3/1446 |
| | | | 345/1.3 |
| 2016/0132280 A1* | 5/2016 | Tomonaga | G06F 3/1438 |
| | | | 345/502 |
| 2016/0335039 A1* | 11/2016 | Cho | G06F 3/1446 |
| 2016/0357493 A1* | 12/2016 | Zerwas | G06F 3/1438 |

FOREIGN PATENT DOCUMENTS

| | | |
|---|---|---|
| KR | 10-2011-0001838 A | 1/2011 |
| KR | 10-2011-0106160 A | 9/2011 |
| KR | 10-1372358 B1 | 3/2014 |
| KR | 10-2015-0029461 A | 3/2015 |

OTHER PUBLICATIONS

Communication dated Apr. 19 2016 issued by Korean Intellectual Property Office in counterpart Korean Patent Application No. 10-2015-0073936.

* cited by examiner

FIG. 8

$\frac{i}{n} \leq Xe$ OR $\frac{i+1}{n} \geq Xs$

OR $\frac{j}{m} \leq Ye$ OR $\frac{j+1}{m} \geq Ys$

⟶ MONITOR INCLUDES IMAGE FROM CAMERA

FIG. 9

① $\frac{i}{n} > Xs \longrightarrow Xa = \frac{i}{n}$

② $\frac{j}{m} > Ys \longrightarrow Ya = \frac{j}{m}$

③ $\frac{i}{n} \leq Xs \longrightarrow Xa = Xs$

④ $\frac{j}{m} \leq Ys \longrightarrow Ya = Ys$

FIG. 10

① $\frac{i+1}{n} > Xe$ ⟶ $Xb = Xe$

② $\frac{j+1}{m} > Ye$ ⟶ $Yb = Ye$

③ $\frac{i+1}{n} \leqq Xe$ ⟶ $Xb = \frac{i+1}{n}$

④ $\frac{j+1}{m} \leqq Ye$ ⟶ $Yb = \frac{j+1}{m}$

SURVEILLANCE SYSTEM INCLUDING VIDEO WALL

CROSS-REFERENCE TO THE RELATED APPLICATION

This application claims priority from Korean Patent Application No. 10-2015-0073936, filed on May 27, 2015, in the Korean Intellectual Property Office, the disclosure of which is incorporated herein in its entirety by reference.

BACKGROUND

1. Field

One or more exemplary embodiments relate to a surveillance system, and more particularly, to a surveillance system including a video wall formed by an arrangement of a plurality of monitors.

2. Description of the Related Art

A surveillance system including a video wall that is formed by a plurality of monitors uses two operational methods.

In the first method, a matrix switcher is used to bridge multiple video decoders and multiple monitors. The matrix switcher distributes n channel video data from the video decoders to m output ports. As the monitors of the video wall perform a partial-image enlarging function, merging/unmerging may be performed. However, it is very complicated to control the video decoders, the matrix switcher, and the plurality of monitors together via online control communications.

In the second method, a matrix switcher and a video matrix device are used to bridge multiple video decoders and multiple monitors. A portion of video data from the matrix switcher may be directly input to a video wall, or may be input to the video wall via the video matrix device to achieve video merging/unmerging. However, the number of monitors that constitute the video wall is restricted according to the number of output ports of the matrix switcher and the video matrix device.

The problems described above were learned by the inventors in the process of conception of the inventive concept. Therefore, the above-described problems of a general video wall are not necessarily known to the public.

SUMMARY

One or more exemplary embodiments may provide a surveillance system including a video wall, by which control via communications becomes easy and the number of monitors of the video wall is not restricted.

Various aspects of the inventive concept will be set forth in the following description and, in part, will be apparent from the description, or may be learned by practice of the exemplary embodiments.

According to an aspect of an exemplary embodiment, there is provided a surveillance system A surveillance system comprising a video wall formed by a plurality of monitors; a plurality of video decoders connected to the plurality of monitors in a one-to-one correspondence and configured to respectively determine at least one image among a plurality of images based on first information, respectively receive an image-allocation area of the at least one image based on second information, the plurality of images respectively being provided from a plurality of cameras, and respectively input the image-allocation area to the plurality of monitors according to the one-to-one correspondence; and a video wall controller configured to provide each of the plurality of video decoders with the first information indicating at least one camera corresponding to the at least one image and the second information indicating an image-allocation area of the at least one image based on an entire image displayed on the video wall.

The plurality of monitors may form an n×m matrix in the video wall in which the images from the plurality of cameras are arranged with different sizes in the entire image, thereby making each of the plurality of monitors display one or more portions of at least one of the images.

The video wall controller may be further configured to: set a horizontal axis coordinate and a vertical axis coordinate of the entire image within a predetermined range, set the horizontal axis coordinate and the vertical axis coordinate of the n×m matrix of monitors within the predetermined range, obtain first coordinates of vertices of the images in the entire image, obtain second coordinates of vertices of each of the monitors forming the n×m matrix, and generate the first information and the second information based on a comparison between the first coordinates and the second coordinates.

The video wall controller may be further configured to generate the first information for a first monitor corresponding to a first video decoder based on whether a first image is at least partially assigned to the first monitor according to the entire image.

The video wall controller may be further configured to determine that a first image is at least partially assigned to the first monitor, when: a horizontal axis coordinate of a left upper vertex of the first monitor is not greater than a horizontal axis coordinate of a right lower vertex of the first image; a horizontal axis coordinate of a right lower vertex of the first monitor is not less than a horizontal axis coordinate of a left upper vertex of the first image; the vertical axis coordinate of the left upper vertex of the first monitor is not greater than the vertical axis coordinate of the right lower vertex of the first image; or the vertical axis coordinate of the right lower vertex of the first monitor is not less than the vertical axis coordinate of the left upper vertex of the first image.

The video wall controller may be further configured to, when a first image is at least partially assigned to a first monitor, generate the second information for the first monitor based on coordinates of a left upper vertex and a right lower vertex of the image-allocation area.

The video wall controller may be further configured to obtain coordinates of the left upper vertex of the image-allocation area for the first monitor by determining that: when a horizontal axis coordinate of a left upper vertex of the first monitor is greater than a horizontal axis coordinate of a left upper vertex of the first image, a horizontal axis coordinate of the left upper vertex of the image-allocation area is identical to the horizontal axis coordinate of the left upper vertex of the first monitor; when a vertical axis coordinate of the left upper vertex of the first monitor is greater than a vertical axis coordinate of the left upper vertex of the first image, a vertical axis coordinate of the left upper vertex of the image-allocation area is identical to the vertical axis coordinate of the left upper vertex of the first monitor; when the horizontal axis coordinate of the left upper vertex of the first monitor is not greater than the horizontal axis coordinate of the left upper vertex of the first image, the horizontal axis coordinate of the left upper vertex of the image-allocation area is identical to the horizontal axis coordinate of the left upper vertex of the first image; and when the vertical axis coordinate of the left upper vertex of the first monitor is not greater than the vertical axis coordinate of the left upper vertex of the first image, the vertical axis coordinate of the left upper vertex of the image-allocation area is identical to the vertical axis coordinate of the left upper vertex of the first image.

The video wall controller may be further configured to obtain coordinates of the right lower vertex of the image-allocation area for the first monitor by determining that: when a horizontal axis coordinate of a right lower vertex of the first monitor is greater than a horizontal axis coordinate of a right lower vertex of the first image, a horizontal axis coordinate of the right lower vertex of the image-allocation area is identical to the horizontal axis coordinate of the right lower vertex of the first image, when a vertical axis coordinate of the right lower vertex of the first monitor is greater than a vertical axis coordinate of the right lower vertex of the first image, a vertical axis coordinate of the right lower vertex of the image-allocation area is identical to the vertical axis coordinate of the right lower vertex of the first image, when the horizontal axis coordinate of the right lower vertex of the monitor is not greater than the horizontal axis coordinate of the right lower vertex of the first image, the horizontal axis coordinate of the right lower vertex of the image-allocation area is identical to the horizontal axis coordinate of the right lower vertex of the first monitor, and when the vertical axis coordinate of the right lower vertex of the first monitor is not greater than the vertical axis coordinate of the right lower vertex of the first image, the vertical axis coordinate of the right lower vertex of the image-allocation area is identical to the vertical axis coordinate of the right lower vertex of the first monitor.

The predetermined range may be 0 to 1.

According to an exemplary embodiment, each of a plurality of monitors forming a video wall may display an image-allocation area as provided by a plurality of video decoders without using a matrix switcher or the like. Accordingly, the following advantages may be obtained.

First, unlike a general surveillance system using a partial-image enlarging function of a monitor and a matrix switcher, the surveillance system according to an exemplary embodiment may be easily controlled through a control over multiple video decoders.

Second, unlike a general surveillance system using a matrix switcher and a video matrix device, in the surveillance system according to an exemplary embodiment, the number of monitors that constitute a video wall is not restricted because the monitors display images provided directly from the video decoders.

Third, since each of the video decoders receives and processes only a corresponding image-allocation area of an image, an operational load of each of the video decoders may be greatly reduced.

Fourth, since equipment such as a matrix switcher is not necessary, the surveillance system according to an exemplary embodiment is more economical than a general surveillance system.

BRIEF DESCRIPTION OF THE DRAWINGS

These and/or other aspects will become apparent and more readily appreciated from the following description of the embodiments, taken in conjunction with the accompanying drawings in which:

FIG. 8 illustrates an algorithm of determining whether an image is at least partially assigned to a monitor based on an entire video wall image, according to an exemplary embodiment;

FIG. 9 illustrates an algorithm of obtaining coordinates of a left upper vertex of an image-allocation area, according to an exemplary embodiment; and FIG. 10 illustrates an algorithm of obtaining coordinates of a right lower vertex of an image-allocation area, according to an exemplary embodiment.

DETAILED DESCRIPTION

The following description and attached drawings are provided for understand of operations according to the exemplary embodiments. Obvious matters that may be easily embodied by one of ordinary skill in the art will not be described here.

The present specification and drawings are not provided to limit the inventive concept, and the scope of the inventive concept should be defined by the following claims. Terms used herein should be interpreted as having a meaning and a concept that are consistent with the technical spirit of the inventive concept.

Hereinafter, exemplary embodiments will be described more fully with reference to the accompanying drawings.

Figure 1:
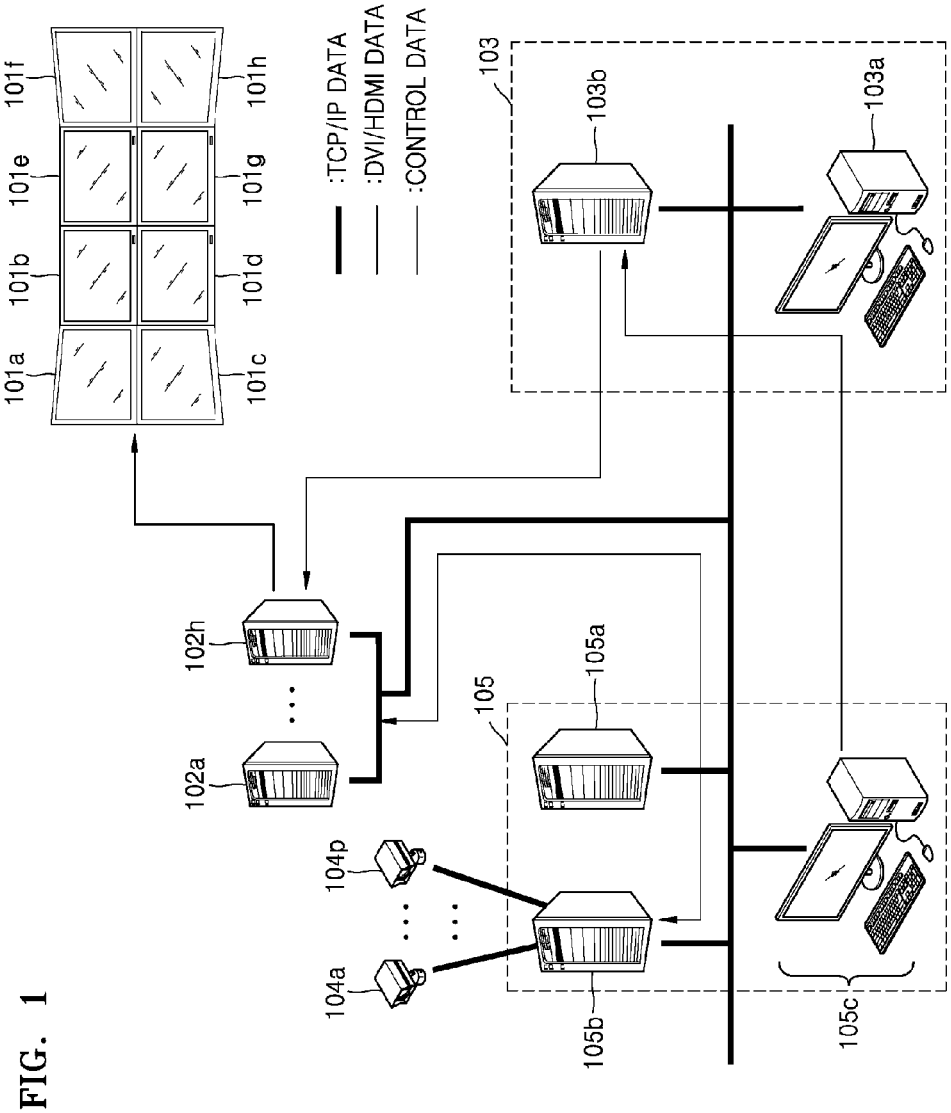
FIG. 1 is a schematic diagram of a surveillance system according to an exemplary embodiment.

FIG. 1 is a schematic diagram of a surveillance system according to an exemplary embodiment.

In the surveillance system, a video wall is formed by an arrangement of a plurality of monitors 101a through 101 h.

The surveillance system may include the monitors 101a through 101h, i.e., a video wall, video decoders 102a through 102h, video wall controller 103, cameras 104a through 104p, and a server system 105.

The video decoders 102a through 102h, the video wall controller 103, the cameras 104a through 104p, and the server device 105 may communicate with one another via a communication protocol, e.g., Transfer Control Protocol/Internet Protocol (TCP/IP).

The server system 105 may include a system manager 105a, a media gateway 105b, and a user console 105c. The system manager 105a, the media gateway 105b, and the user console 105c may communicate with one another via a communication protocol, e.g., TCP/IP.

The system manager 105a may store and manage data and information necessary for a system operation to control overall operations of the surveillance system.

The media gateway 105b may relay TCP/IP communications between the cameras 104a through 104p and the video decoders 102a through 102h, and selectively transmit images from the cameras 104a through 104p to the video decoders 102a through 102h according to requests of the video decoders 102a through 102h.

The user console 105c may provide a user with graphical user interfaces (GUIs) from the video wall controller 103, and may transmit an image pattern of a video wall set by the user to the video wall controller 103 as control data.

The video wall controller 103 may be independent from the system manager 105a to reduce an operational load of the system manager 105a. However, according to an exemplary embodiment, the video wall controller 103 may be included in the system manager 105a.

According to an entire image of a video wall formed by the user console 105c, the video wall controller 103 may provide, as control data, information about camera(s) and an image-allocation area of corresponding image(s), to each of the plurality of video decoders 102a through 102h. The video wall controller 103 may generate information about camera(s) from which each video decoder receives an image-allocation area of an image. The image-allocation area is a portion of the image corresponding to the camera identified by the information. The video wall controller 103 may also generate information about the image-allocation area. More detailed description of the information will be provided with reference to FIGS. 2-10.

The video decoders 102a through 102h may be connected to the monitors 101a through 101h in a one-to-one correspondence. The video decoders 102a through 102h may selectively receive compressed images from the cameras 104a through 104p, decode the received compressed images, and input images restored by the decoding to the monitors 101a through 101h. Video data input from the video decoders 102a through 102h to the monitors 101a through 101h may be digital video interface (DVI) data or high definition multimedia interface (HDMI) data.

Each of the video decoders 102a through 102h may receive and process only corresponding allocation area(s) from among one or more images provided by at least one camera.

Accordingly, each of the plurality of monitors 101a through 101h may display corresponding allocation area(s) from among the image of at least one allocated camera, in order to form a video wall. In other words, without using a matrix switcher or the like, the video decoders 102a through 102h may be used to form a video wall without using a matrix switcher or the like. Accordingly, the following effects may be obtained.

First, compared with a general video wall system that requires a matrix switcher and uses a partial-image enlarging function of a monitor, the video decoders 102a through 102h may be used to directly control the video wall, and thus the video wall may be easily controlled via communication.

Second, compared with a general video wall system that requires and uses a matrix switcher, the monitors 101a through 101h directly display images from the video decoders 102a through 102h respectively corresponding to the monitors 101a through 101h. As a result, the number of monitors 101a through 101h that constitute a video wall is not restricted.

Third, since each of the video decoders 102a through 102h receives and processes only corresponding allocation area(s) from among the image(s) of at least one camera allocated to each of the video decoders 102a through 102h, an operational load of each of the video decoders 102a through 102h may be greatly reduced.

Fourth, since equipment such as a matrix switcher is not necessary, the surveillance system according to an exemplary embodiment is economical.

The video wall controller 103 may include a virtual matrix manager (VMM) 103a and a virtual matrix gateway (VMG) 103b.

The VMM 103a may provide the user console 105c with a GUI for setting an image pattern of a video wall, and receive information about an entire image of the video wall set by the user console 105c. Then, according to the entire image of the video wall formed by the user console 105c, the VMM 103a may obtain information about a camera and an image-allocation area for at least one image that is to be received by each of the plurality of video decoders 102a through 102h. This will be described in detail with reference to FIGS. 2-10.

According to the information about the camera and the image-allocation area received from the VMM 103a, the VMG 103b may extract information corresponding to each of the video decoders 102a through 102h and transmit the extracted information as control data to each of the video decoders 102a through 102h.

Figure 2:
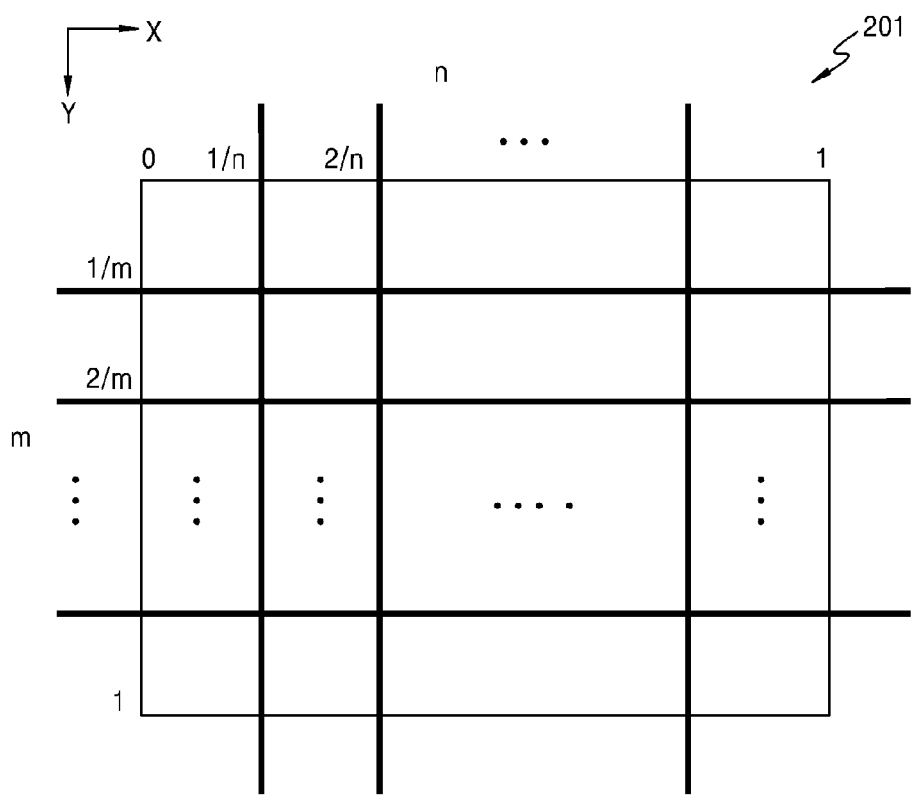
FIG. 2 shows a video wall formed by a matrix of n×m monitors, according to an exemplary embodiment.

FIG. 2 shows that a horizontal axis (X-axis) coordinate and a vertical axis (Y-axis) coordinate of a matrix of n×m monitors 201 are set within a range of 0 to 1 by the VMM 103a.

Figure 3:
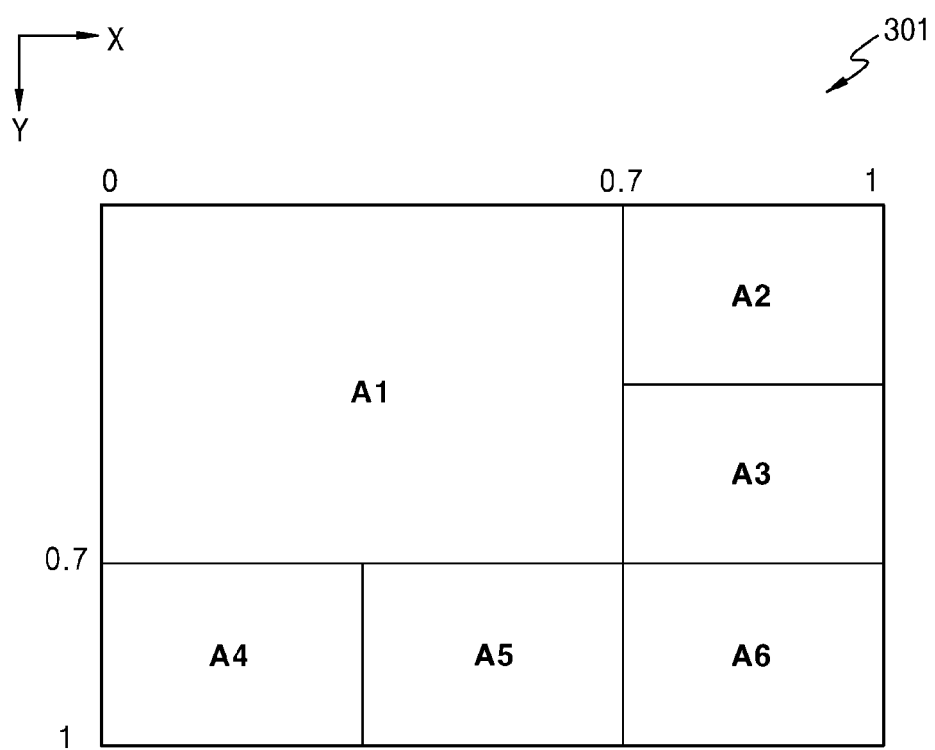
FIG. 3 shows a video wall displaying a plurality of images arranged to have different sizes, according to an exemplary embodiment.

FIG. 3 shows that a horizontal axis (X-axis) coordinate and a vertical axis (Y-axis) coordinate of an entire image 301 of a video wall are set within a range of 0 to 1 by the VMM 103a included in the video wall controller 103 of FIG. 1.

Referring to FIGS. 1-3, the plurality of monitors 201 form a matrix, and the number of monitors 201 is n×m because n monitors 201 (n is an integer greater than 1) exist in the horizontal axis (X-axis) and m monitors 201 (m is an integer greater than 1) exist in the vertical axis (Y-axis). The horizontal axis (X-axis) coordinate and the vertical axis (Y-axis) coordinate of the matrix of the n×m monitors 201 are set within the range of 0 to 1.

Similarly, the entire image 301 of the video wall formed by the user console 105c has a horizontal axis (X-axis) coordinate and a vertical axis (Y-axis) coordinate set within the range of 0 to 1. Images received from the plurality of cameras 104a through 104p may be arranged to have different sizes in the video wall. For example, images A1 through A6, which are respectively received from the cameras 102a through 102f, may be arranged to have different sizes, as shown in FIG. 3.

Accordingly, each of the plurality of monitors 201 may display at least a portion of an image which is received from at least one camera. An exemplary embodiment related to this will be described in more detail with reference to FIGS. 4 and 5.

Figure 4:
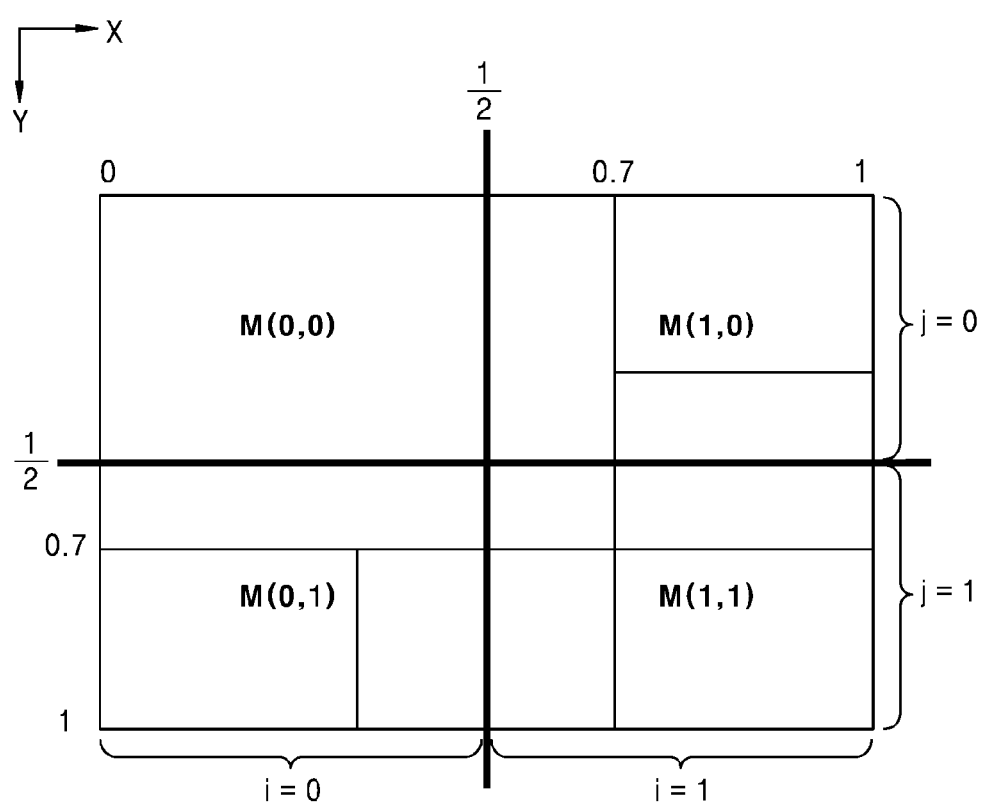
FIG. 4 shows a view in which a matrix of 2×2 monitors overlaps an entire video wall image, according to an exemplary embodiment.

FIG. 4 shows a matrix pattern of 2×2 monitors M(0,0) through M(1,1) overlapped with the entire image 301 of the video wall of FIG. 3.

Figure 5:
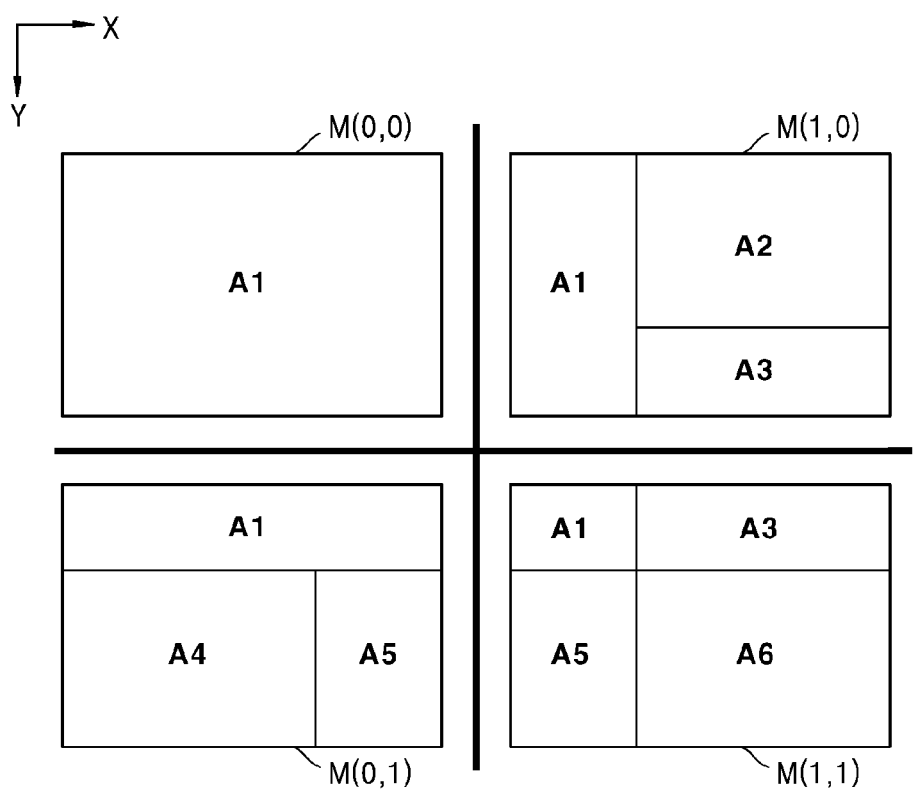
FIG. 5 shows a plurality of image-allocation areas assigned to a plurality of monitors of a video wall, according to an exemplary embodiment.

FIG. 5 shows at least one image to be displayed on each of the monitors M(0,0) through M(1,1) according to the overlapping of FIG. 4.

Each of the four monitors M(0,0) through M(1,1) of the video wall may display at least a portion of an image that is received from at least one camera.

For example, referring to FIGS. 3 through 5, a first monitor M(0,0) may display only a portion of an enlarged image A1 from a first camera 102a. A second monitor M(1,0) may display a portion of the enlarged image A1 from the first camera 102a, the entire portion of a shrunk image A2 from a second camera, and an upper half of a shrunk image A3 from a third camera. A third monitor M(0.1) may display a lower portion of the enlarged image A1 from the first camera 102a, the entire portion of a shrunk image A4 from a fourth camera, and a left half of a shrunk image A5 from a fifth camera. A fourth monitor M(1,1) needs to display a right bottom portion of the enlarged image A1 from the first camera 102*a*, a lower half of the shrunk image A3 from the third camera, a right half of the shrunk image A5 from the fifth camera, and the entire portion of a shrunk image A6 from the sixth camera.

Figure 6:
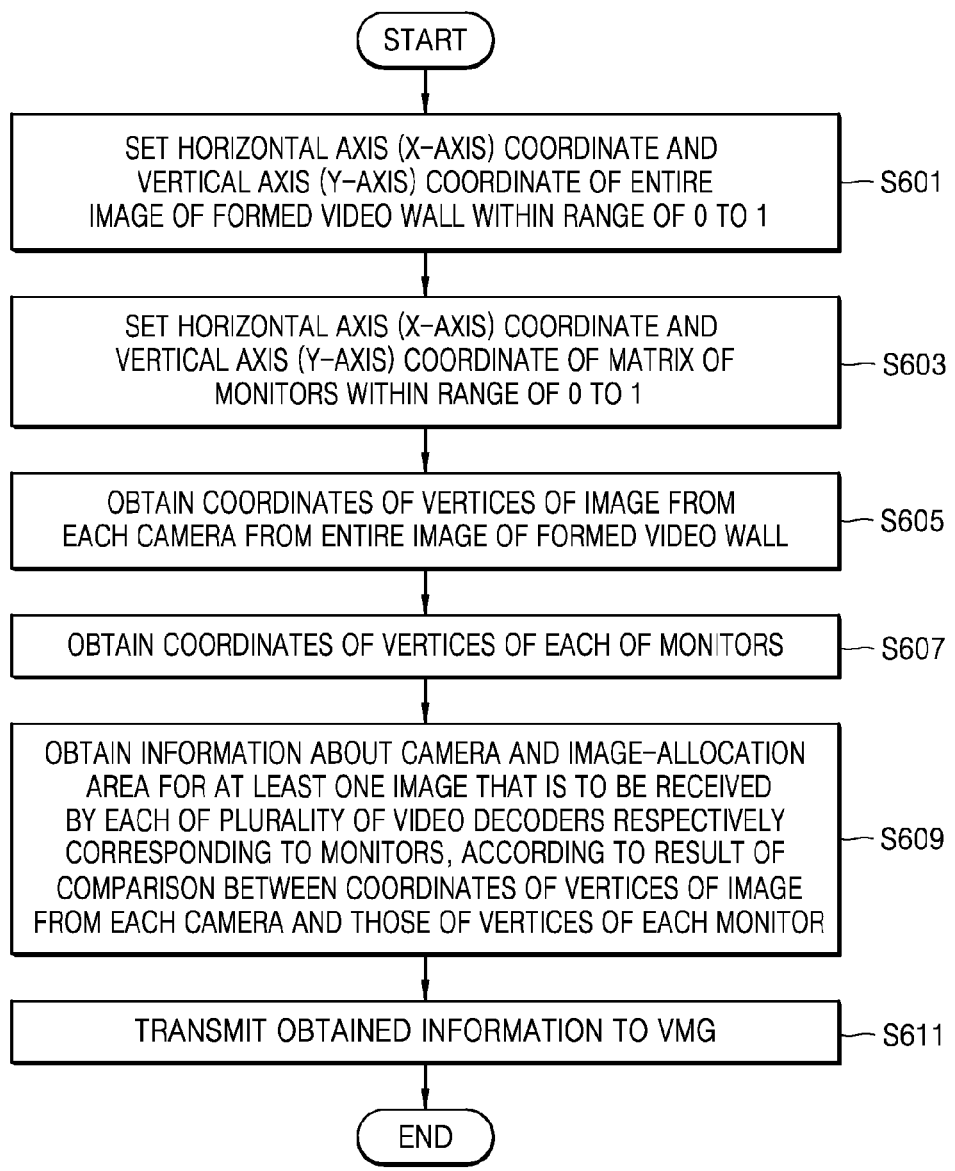
FIG. 6 is a flowchart illustrating a method of generating information about a camera and an image-allocation area of a corresponding image, according to an exemplary embodiment.

FIG. 6 is a flowchart illustrating operations of the VMM 103*a* included in the video wall controller 103, according to an exemplary embodiment.

Figure 7:
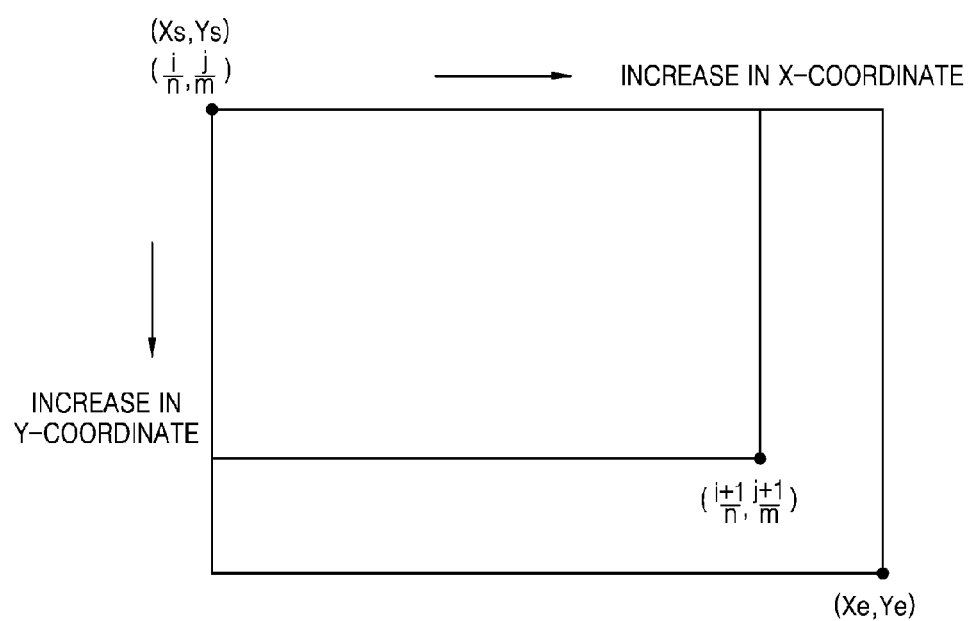
FIG. 7 illustrates a method of setting coordinates of a monitor and an image, according to an exemplary embodiment.

FIG. 7 is a view illustrating a method of obtaining information about a camera and an image-allocation area, according to an exemplary embodiment. Specifically, FIG. 7 shows the entire portion of the enlarged image A1 from the first camera 102*a* and a display area of the first monitor M(0,0) corresponding to the enlarged image A1 in FIGS. 4 and 5.

The major operations of the VMM 103*a* included in the video wall controller 103 will now be described with reference to FIGS. 1 and 3-7.

In operation S601, the VMM 103*a* may set the horizontal axis (X-axis) coordinate and the vertical axis (Y-axis) coordinate of the entire image 301 of the video wall formed by the user console 105*c*, within the range of 0 to 1.

In operation S603, the VMM 103*a* may set the horizontal axis (X-axis) coordinate and the vertical axis (Y-axis) coordinate of the matrix of the n×m (e.g., 2×2 as in FIGS. 4 and 5) monitors M(0,0) through M(1,1), within the range of 0 to 1.

In operation S605, the VMM 103*a* may obtain the coordinates of vertices of each of the images (e.g., A1-A6) in the entire image 301 of the video wall formed by the user console 105*c*.

In obtaining the coordinates of the vertices of the images, only coordinates (Xs,Ys) of left upper vertices and coordinates (Xe,Ye) of right lower vertices of the images may be used. In other words, a relative position and an area of each of the images, e.g., A1 through A6, may be recognized based on (Xs,Ys) and (Xe,Ye) of the images, e.g., A1 through A6.

In operation S607, the VMM 103*a* may obtain the coordinates of the vertices of each of the n×m (e.g., 2×2 as in FIGS. 4 and 5) monitors.

As aforementioned, the coordinates of all vertices of each of the monitors may be obtained using coordinates $$\left(\frac{i}{n}, \frac{j}{m}\right)$$

of a left upper vertex and coordinates $$\left(\frac{i+1}{n}, \frac{j+1}{m}\right)$$

of a right lower vertex of the monitors. In other words, a relative position and an area of each of the display areas of the monitors may be recognized based on $$\left(\frac{i}{n}, \frac{j}{m}\right) \text{ and } \left(\frac{i+1}{n}, \frac{j+1}{m}\right)$$

of the right lower vertex of the monitors.

In the coordinates $$\left(\frac{i}{n}, \frac{j}{m}\right)$$

of the left upper vertex, the "i" (where i is 0 or a positive integer) indicates a monitor number on the horizontal axis (X-axis). The monitors on the horizontal axis may be numbered in ascending order from the left upper end to the right upper end. The "n" indicates the total number of monitors on the horizontal axis (X-axis), i.e., in a row. The "j" (where j is 0 or a positive integer) indicates a monitor index number on the vertical axis (Y-axis). The monitors on the vertical axis may be numbered in ascending order from the left upper end to the left lower end. The "m" indicates the total number of monitors on the vertical axis (Y-axis), i.e., in a column. Accordingly, the coordinates of the right lower vertices of the monitors are $$\left(\frac{i+1}{n}, \frac{j+1}{m}\right).$$

For example, in the case of FIGS. 4 and 5, the coordinates $$\left(\frac{i}{n}, \frac{j}{m}\right)$$

of the left upper vertex of the first monitor M(0,0) are (0/2, 0/2), namely, (0,0). The coordinates $$\left(\frac{i+1}{n}, \frac{j+1}{m}\right)$$

of the right lower vertex of the first monitor M(0,0) are (½, ½).

Then, in operation S609, according to a result of a comparison of vertices coordinates between each image and each monitor, the VMM 103*a* may obtain information about a camera and an image-allocation area for at least one image that is to be received by each of the plurality of video decoders respectively corresponding to the monitors of the video wall. The operation S609 will be described in more detail with reference to FIGS. 7-10.

In operation S611, the VMM 103*a* may transmit the information obtained in operation S609 to the VMG 103*b*. Accordingly to the information about the camera and the image-allocation area from the VMM 103*a*, the VMG 103*b* may extract information for each of the video decoders 102*a* through 102*h* and transmit the extracted information as control data to each of the video decoders 102*a* through 102*h*.

FIG. 8 illustrates an algorithm of determining whether an image is at least partially assigned to a monitor, according to an exemplary embodiment.

Referring to FIGS. 1, 7, and 8, the VMM 103*a* may determine whether each of the images is at least partially to be displayed by each of the monitors. Specifically, a monitor is determined to at least partially display, i.e., include, an image when one of the following 4 conditions is met. In other words, when none of the following 4 conditions is met, the VMM 103*a* may determine that the monitor does not include the image.

The first condition is that the horizontal axis (X-axis) coordinate $$\left(\frac{i}{n}\right)$$

of a left upper vertex of the monitor is not greater than the horizontal axis (X-axis) coordinate (Xe) of a right lower vertex of the image. The first condition is met in the case of FIG. 7. The first condition may be expressed as inequality 1 below.

$$\frac{i}{n} \leq Xe \qquad \text{[Inequality 1]}$$

The second condition is that the horizontal axis (X-axis) coordinate $$\left(\frac{i+1}{n}\right)$$

of a right lower vertex of the monitor is not less than the horizontal axis (X-axis) coordinate (Xs) of a left upper vertex of the image. The second condition is met in the case of FIG. 7. The second condition may be expressed as inequality 2 below.

$$\frac{i+1}{n} \geq Xs \qquad \text{[Inequality 2]}$$

The third condition is that the vertical axis (Y-axis) coordinate $$\left(\frac{j}{m}\right)$$

of a left upper vertex of the monitor is not greater than the vertical axis (Y-axis) coordinate (Ye) of a right lower vertex of the image. The third condition is established in the case of FIG. 7. The third condition is expressed as inequality 3 below.

$$\frac{j}{m} \leq Ye \qquad \text{[Inequality 3]}$$

The fourth condition is that the vertical axis (Y-axis) coordinate $$\left(\frac{j+1}{m}\right)$$

of a right lower vertex of the monitor is not less than the vertical axis (Y-axis) coordinate (Ys) of a left upper vertex of the image. The fourth condition is met in the case of FIG. 7. The fourth condition may be expressed as inequality 4 below.

$$\frac{j+1}{m} \geq Ys \qquad \text{[Inequality 4]}$$

FIG. 9 shows an algorithm of obtaining the coordinates (Xa,Ya) of a left upper vertex of an image-allocation area, according to an exemplary embodiment. Referring to FIGS. 1, 7, and 9, when a monitor (for example, 101a) includes an image from a camera (for example, 104a), the following 4 algorithms may be applied to obtain the coordinates (Xa,Ya) of a left upper vertex of an image-allocation area that is to be received and decoded by a decoder (for example, 102a) corresponding to the monitor 101a.

First, when the horizontal axis (X-axis) coordinate $$\left(\frac{i}{n}\right)$$

of a left upper vertex of the monitor 101a is greater than the horizontal axis (X-axis) coordinate (Xs) of a left upper vertex of an image from the camera 104a, the horizontal axis (X-axis) coordinate (Xa) of the left upper vertex of the image-allocation area may be identical to the horizontal axis (X-axis) coordinate $$\left(\frac{i}{n}\right)$$

of the left upper vertex of the monitor 101a.

Second, when the vertical axis (Y-axis) coordinate $$\left(\frac{j}{m}\right)$$

of the left upper vertex of the monitor 101a is greater than the vertical axis (Y-axis) coordinate (Ys) of the left upper vertex of the image from the camera 104a, the vertical axis (Y-axis) coordinate (Ya) of the left upper vertex of the image-allocation area may be identical to the vertical axis (Y-axis) coordinate $$\left(\frac{j}{m}\right)$$

of the left upper vertex of the monitor 101a.

Third, when the horizontal axis (X-axis) coordinate $$\left(\frac{i}{n}\right)$$

of the left upper vertex of the monitor 101a is not greater than the horizontal axis (X-axis) coordinate (Xs) of the left upper vertex of the image from the camera 104a, the horizontal axis (X-axis) coordinate (Xa) of the left upper vertex of the image-allocation area may be identical to the horizontal axis (X-axis) coordinate (Xs) of the left upper vertex of the image from the camera 104a.

Fourth, when the vertical axis (Y-axis) coordinate $$\left(\frac{j}{m}\right)$$

of the left upper vertex of the monitor 101*a* is not greater than the vertical axis (Y-axis) coordinate (Ys) of the left upper vertex of the image from the camera 104*a*, the vertical axis (Y-axis) coordinate (Ya) of the left upper vertex of the image-allocation area may be identical to the vertical axis (Y-axis) coordinate (Ys) of the left upper vertex of the image from the camera 104*a*.

FIG. 10 shows an algorithm of obtaining the coordinates (Xb,Yb) of a right lower vertex of an image-allocation area. Referring to FIGS. 1, 7, and 10, when a monitor (for example, 101*a*) includes an image from a camera (for example, 104*a*), the following 4 algorithms may be applied to obtain the coordinates (Xb,Yb) of a right lower vertex of an image-allocation area that is to be received and decoded by a decoder (for example, 102*a*) corresponding to the monitor 101*a*.

First, when the horizontal axis (X-axis) coordinate $$\left(\frac{i+1}{n}\right)$$

of a right lower vertex of the monitor 101*a* is greater than the horizontal axis (X-axis) coordinate (Xs) of a right lower vertex of the image from the camera 104*a*, the horizontal axis (X-axis) coordinate (Xb) of the right lower vertex of the image-allocation area may be identical to the horizontal axis (X-axis) coordinate (Xe) of the right lower vertex of the image from the camera 101*a*.

Second, when the vertical axis (Y-axis) coordinate $$\left(\frac{j+1}{m}\right)$$

of the right lower vertex of the monitor 101*a* is greater than the vertical axis (Y-axis) coordinate (Ye) of the right lower vertex of the image from the camera 104*a*, the vertical axis (Y-axis) coordinate (Yb) of the right lower vertex of the image-allocation area may be identical to the vertical axis (Y-axis) coordinate (Ye) of the right lower vertex of the image from the camera 104*a*.

Third, when the horizontal axis (X-axis) coordinate $$\left(\frac{i+1}{n}\right)$$

of a right lower vertex of the monitor 101*a* is not greater than the horizontal axis (X-axis) coordinate (Xe) of a right lower vertex of the image from the camera 104*a*, the horizontal axis (X-axis) coordinate (Xb) of the right lower vertex of the image-allocation area may be identical to the horizontal axis (X-axis) coordinate $$\left(\frac{i+1}{n}\right)$$

of the right lower vertex of the monitor 101*a*.

Fourth, when the vertical axis (Y-axis) coordinate $$\left(\frac{j+1}{m}\right)$$

of the right lower vertex of the monitor 101*a* is not greater than the vertical axis (Y-axis) coordinate (Ye) of the right lower vertex of the image from the camera 104*a*, the vertical axis (Y-axis) coordinate (Yb) of the right lower vertex of the image-allocation area may be identical to the vertical axis (Y-axis) coordinate $$\left(\frac{j+1}{m}\right)$$

of the right lower vertex of the monitor 101*a*.

As described above, in a surveillance system according to an exemplary embodiment, each of a plurality of monitors forming a video wall may display an image-allocation area as provided by a plurality of video decoders without using a matrix switcher or the like. Accordingly, the following advantages may be obtained.

First, unlike a general surveillance system using a partial-image enlarging function of a monitor and a matrix switcher, the surveillance system according to an exemplary embodiment may be easily controlled through a control over multiple video decoders.

Second, unlike a general surveillance system using a matrix switcher and a video matrix device, the number of monitors that constitute a video wall is not restricted in the surveillance system according to an exemplary embodiment because the monitors display images provided directly from the video decoders.

Third, since each of the video decoders receives and processes only a corresponding image-allocation area, an operational load of each of the video decoders may be greatly reduced.

Fourth, since equipment such as a matrix switcher is not necessary, the surveillance system according to an exemplary embodiment is more economical than a general surveillance system.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:
1. A surveillance system comprising:
a video wall formed by a plurality of monitors;
a plurality of video decoders connected to the plurality of monitors in a one-to-one correspondence and configured to respectively determine at least on image among a plurality of images based on first information, respectively receive an image-allocation area of the at least one image based on second information, the plurality of images respectively being provided from a plurality of cameras, and respectively input the image-allocation area to the plurality of monitors according to the one-to-one correspondence; and a video wall controller configured to provide each of the plurality of video decoders with the first information indicating at least one camera corresponding to the at least one image and the second information indicating the image-allocation area of the at least one image based on an entire image displayed on the video wall, wherein the plurality of monitors form an n×m matrix in the video wall in which the plurality of images have different sizes in the entire image, wherein the video wall controller is further configured to:

set a horizontal axis coordinate and a vertical axis coordinate of the entire image within a predetermined range;

set the horizontal axis coordinate and the vertical axis coordinate of the n×m matrix of monitors within the predetermined range;

obtain first coordinates of vertices of the images in the entire image;

obtain second coordinates of vertices of each of the monitors forming the n×m matrix; and generate the first information and the second information based on a comparison between the first coordinates and the second coordinates.

2. The surveillance system of claim 1, wherein the video wall controller is further configured to generate the first information for a first monitor corresponding to a first video decoder based on whether a first image is at least partially assigned to the first monitor according to the entire image.

3. The surveillance system of claim 2, wherein the video wall controller is further configured to determine that the first image is at least partially assigned to the first monitor, when:

a horizontal axis coordinate of a left upper vertex of the first monitor is not greater than a horizontal axis coordinate of a right lower vertex of the first image;

a horizontal axis coordinate of a right lower vertex of the first monitor is not less than a horizontal axis coordinate of a left upper vertex of the first image;

the vertical axis coordinate of the left upper vertex of the first monitor is not greater than the vertical axis coordinate of the right lower vertex of the first image; or the vertical axis coordinate of the right lower vertex of the first monitor is not less than the vertical axis coordinate of the left upper vertex of the first image.

4. The surveillance system of claim 1, wherein the video wall controller is further configured to, when a first image is at least partially assigned to a first monitor, generate the second information for the first monitor based on coordinates of a left upper vertex and a right lower vertex of the image-allocation area.

5. The surveillance system of claim 4, wherein the video wall controller is further configured to obtain coordinates of the left upper vertex of the image-allocation area for the first monitor by determining that:

when a horizontal axis coordinate of a left upper vertex of the first monitor is greater than a horizontal axis coordinate of a left upper vertex of the first image, a horizontal axis coordinate of the left upper vertex of the image-allocation area is identical to the horizontal axis coordinate of the left upper vertex of the first monitor;

when a vertical axis coordinate of the left upper vertex of the first monitor is greater than a vertical axis coordinate of the left upper vertex of the first image, a vertical axis coordinate of the left upper vertex of the image-allocation area is identical to the vertical axis coordinate of the left upper vertex of the first monitor;

when the horizontal axis coordinate of the left upper vertex of the first monitor is not greater than the horizontal axis coordinate of the left upper vertex of the first image, the horizontal axis coordinate of the left upper vertex of the image-allocation area is identical to the horizontal axis coordinate of the left upper vertex of the first image; and when the vertical axis coordinate of the left upper vertex of the first monitor is not greater than the vertical axis coordinate of the left upper vertex of the first image, the vertical axis coordinate of the left upper vertex of the image-allocation area is identical to the vertical axis coordinate of the left upper vertex of the first image.

6. The surveillance system of claim 4, wherein the video wall controller is further configured to obtain coordinates of the right lower vertex of the image-allocation area for the first monitor by determining that:

when a horizontal axis coordinate of a right lower vertex of the first monitor is greater than a horizontal axis coordinate of a right lower vertex of the first image, a horizontal axis coordinate of the right lower vertex of the image-allocation area is identical to the horizontal axis coordinate of the right lower vertex of the first image;

when a vertical axis coordinate of the right lower vertex of the first monitor is greater than a vertical axis coordinate of the right lower vertex of the first image, a vertical axis coordinate of the right lower vertex of the image-allocation area is identical to the vertical axis coordinate of the right lower vertex of the first image;

when the horizontal axis coordinate of the right lower vertex of the monitor is not greater than the horizontal axis coordinate of the right lower vertex of the first image, the horizontal axis coordinate of the right lower vertex of the image-allocation area is identical to the horizontal axis coordinate of the right lower vertex of the first monitor; and when the vertical axis coordinate of the right lower vertex of the first monitor is not greater than the vertical axis coordinate of the right lower vertex of the first image, the vertical axis coordinate of the right lower vertex of the image-allocation area is identical to the vertical axis coordinate of the right lower vertex of the first monitor.

7. The surveillance system of claim 1, wherein the predetermined range is 0 to 1.

8. A method of controlling a video wall in a surveillance system comprising:

providing each of a plurality of video decoders with first information indicating at least one camera corresponding to at least one image and second information indicating an image-allocation area of the at least one image based on an entire image displayed on the video wall, wherein the video wall comprises a plurality of monitors, wherein the plurality of monitors form an n×m matrix in the video wall in which the plurality of images have different sizes in the entire image, wherein the plurality of video decoders connected to the plurality of monitors in a one-to-one correspondence, wherein the plurality of video decoders respectively determine the at least one image among a plurality of images based on the first information, respectively receive the image-allocation area of the at least one image based on the second information, the plurality of images respectively being provided from a plurality of cameras, and respectively input the image-allocation area to the plurality of monitors according to the one-to-one correspondence;

setting a horizontal axis coordinate and a vertical axis coordinate of the entire image of the video wall within a predetermined range;

setting the horizontal axis coordinate and the vertical axis coordinate of the n×m matrix of monitors within the predetermined range;

obtaining first coordinates of vertices of the images in the entire image;

obtaining second coordinates of vertices of each of the monitors forming the n×m matrix; and generating the first information and the second information based on a comparison between the first coordinates and the second coordinates.

9. The method of claim 8, further comprising generating the first information for a first monitor corresponding to a first video decoder based on whether a first image is at least partially assigned to the first monitor according to the entire image.

10. The surveillance system of claim 9, further comprising determining that the first image is at least partially assigned to the first monitor, when:
a horizontal axis coordinate of a left upper vertex of the first monitor is not greater than a horizontal axis coordinate of a right lower vertex of the first image;
a horizontal axis coordinate of a right lower vertex of the first monitor is not less than a horizontal axis coordinate of a left upper vertex of the first image;
the vertical axis coordinate of the left upper vertex of the first monitor is not greater than the vertical axis coordinate of the right lower vertex of the first image; or
the vertical axis coordinate of the right lower vertex of the first monitor is not less than the vertical axis coordinate of the left upper vertex of the first image.

11. The method of claim 8, further comprising, when a first image is at least partially assigned to a first monitor, generating the second information for the first monitor based on coordinates of a left upper vertex and a right lower vertex of the image-allocation area.

12. The surveillance system of claim 11, further comprising obtaining coordinates of the left upper vertex of the image-allocation area for the first monitor by determining that:
when a horizontal axis coordinate of a left upper vertex of the first monitor is greater than a horizontal axis coordinate of a left upper vertex of the first image, a horizontal axis coordinate of the left upper vertex of the image-allocation area is identical to the horizontal axis coordinate of the left upper vertex of the first monitor;

when a vertical axis coordinate of the left upper vertex of the first monitor is greater than a vertical axis coordinate of the left upper vertex of the first image, a vertical axis coordinate of the left upper vertex of the image-allocation area is identical to the vertical axis coordinate of the left upper vertex of the first monitor;

when the horizontal axis coordinate of the left upper vertex of the first monitor is not greater than the horizontal axis coordinate of the left upper vertex of the first image, the horizontal axis coordinate of the left upper vertex of the image-allocation area is identical to the horizontal axis coordinate of the left upper vertex of the first image; and when the vertical axis coordinate of the left upper vertex of the first monitor is not greater than the vertical axis coordinate of the left upper vertex of the first image, the vertical axis coordinate of the left upper vertex of the image-allocation area is identical to the vertical axis coordinate of the left upper vertex of the first image.

13. The method of claim 11, further comprising obtaining coordinates of the right lower vertex of the image-allocation area for the first monitor by determining that:
when a horizontal axis coordinate of a right lower vertex of the first monitor is greater than a horizontal axis coordinate of a right lower vertex of the first image, a horizontal axis coordinate of the right lower vertex of the image-allocation area is identical to the horizontal axis coordinate of the right lower vertex of the first image;

when a vertical axis coordinate of the right lower vertex of the first monitor is greater than a vertical axis coordinate of the right lower vertex of the first image, a vertical axis coordinate of the right lower vertex of the image-allocation area is identical to the vertical axis coordinate of the right lower vertex of the first image;

when the horizontal axis coordinate of the right lower vertex of the monitor is not greater than the horizontal axis coordinate of the right lower vertex of the first image, the horizontal axis coordinate of the right lower vertex of the image-allocation area is identical to the horizontal axis coordinate of the right lower vertex of the first monitor; and when the vertical axis coordinate of the right lower vertex of the first monitor is not greater than the vertical axis coordinate of the right lower vertex of the first image, the vertical axis coordinate of the right lower vertex of the image-allocation area is identical to the vertical axis coordinate of the right lower vertex of the first monitor.

14. The method of claim 8, wherein the predetermined range is 0 to 1.

* * * * *